Sept. 4, 1923.
L. ESPENSCHIED
1,466,707
METHOD OF AND APPARATUS FOR LIMITING THE TRANSMISSION OF ELECTRICAL ENERGY
Filed March 16, 1916    2 Sheets-Sheet 1
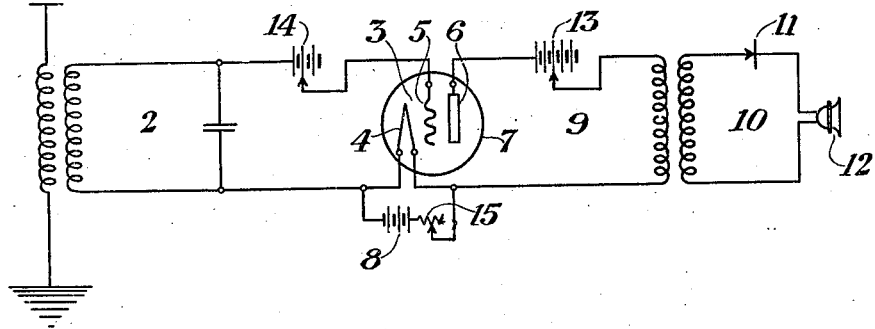
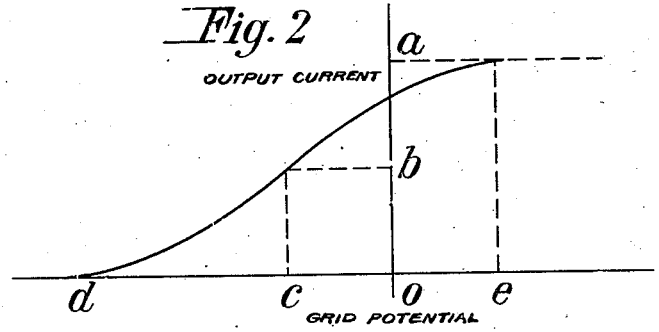
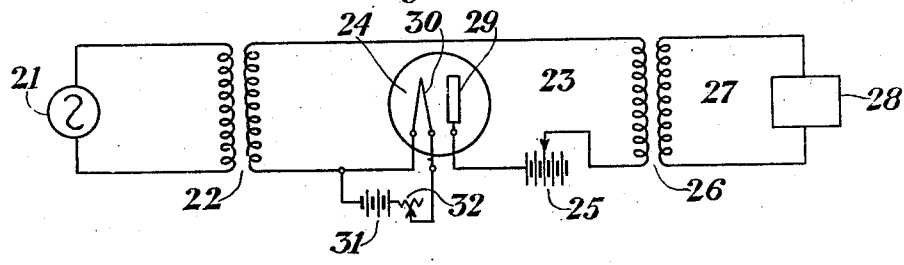
Inventor:
L. Espenschied
per Thomas D. Lockwood
Attorney.

Sept. 4, 1923.                                                    1,466,707
                          L. ESPENSCHIED
METHOD OF AND APPARATUS FOR LIMITING THE TRANSMISSION OF ELECTRICAL ENERGY
                  Filed March 16, 1916        2 Sheets-Sheet 2
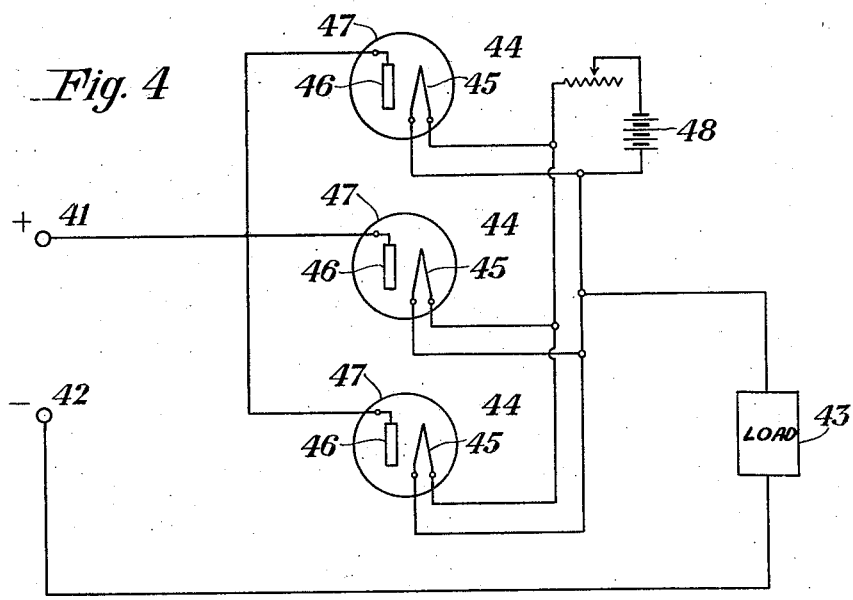
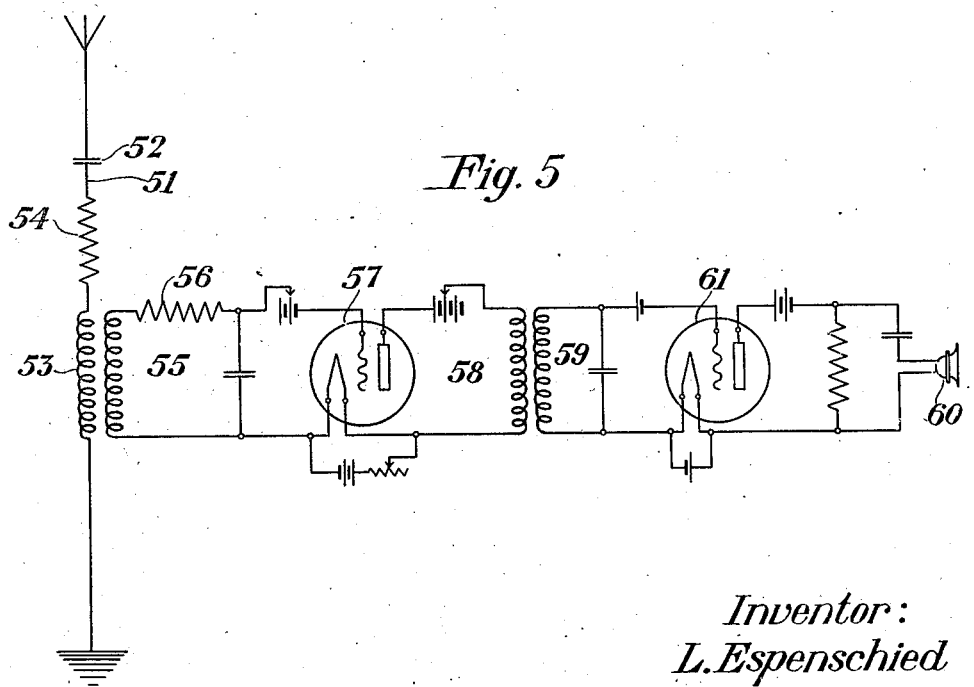
*Inventor:*
*L. Espenschied*
*per Thomas D. Lockwood*
*Attorney.*

Patented Sept. 4, 1923.

1,466,707

UNITED STATES PATENT OFFICE.

LLOYD ESPENSCHIED, OF HOLLIS, NEW YORK, ASSIGNOR TO AMERICAN TELEPHONE AND TELEGRAPH COMPANY, A CORPORATION OF NEW YORK.

METHOD OF AND APPARATUS FOR LIMITING THE TRANSMISSION OF ELECTRICAL ENERGY.

Application filed March 16, 1916. Serial No. 84,592.

*To all whom it may concern:*

Be it known that I, LLOYD ESPENSCHIED, residing at Hollis, in the county of Queens and State of New York, have invented certain Improvements in Methods of and Apparatus for Limiting the Transmission of Electrical Energy, of which the following is a specification.

This invention relates to an electric circuit protecting device and more particularly to a protecting device comprising an evacuated vessel in which the electric current is carried by thermions. Its object is to provide protection for a receiving or a generating device such that the amount of current or energy delivered to said receiving device or from said generating device cannot exceed a preassigned value.

The object of my invention is attained by inserting between a source of energy and a receiving device a so-called thermionic device having such characteristics, as hereinafter shown, that the current which can be transmitted through said thermionic device has a definite adjustable maximum which limits the maximum current transmissible to said receiving device.

My invention is best understood by reference to the accompanying drawings, in which Figures 1, 3, 4 and 5 are diagrams illustrating organizations embodying the power limiting devices of my invention and Figure 2 is a diagram explanatory of the operation of the organization of Figure 1.

A thermionic device of the type embodied in the present invention is a well-known structure and consists of an evacuated vessel containing a heated electron emitting cathode, and an anode. It may also contain an auxiliary electrode, hereinafter referred to as a grid. It is well known that, when said vessel is evacuated to a very high degree, the only source of current carriers is the heated cathode, said cathode, when heated, emitting negative electrons which travel, under the influence of an electric field, from cathode to anode and in so doing convey the electric current. Since the cathode is the exclusive source of current carriers and since these are exclusively negative, current can flow in one direction only, from anode to cathode. Further the maximum current is limited by the rate of electron emission from the cathode, this rate being a function of the temperature. By controlling the temperature of the filament it is therefore possible to control the maximum current and thereby to limit the amount of current transmissible through the device. This is the broad principle on which the power limiting devices of my invention are based.

Referring to Figure 1 which is a diagram illustrating a wireless receiving system embodynig a protecting or power limiting device, 1 is an antenna coupled to an oscillation circuit 2. 3 is a thermionic device comprising a cathode 4, grid 5 and anode 6 enclosed in an evacuated vessel 7. The cathode 4 and grid 5 are connected to the oscillation circuit 2. Battery 8 heats the cathode 4 and renders it electron-emitting. The output circuit includes a source of direct current such as the battery 13. Coupled to said output circuit is a circuit 10 containing a rectifier 11 and a receiver 12.

The function of the thermionic device 3 is twofold; first it acts as an amplifier of the received energy and secondly it limits the maximum amount of current or energy delivered to receiver 12.

Figure 2 is a diagram illustrating the operating characteristics of thermionic device 3 of Figure 1. The ordinates are values of the current flowing in output circuit 9, while the abscissæ are values of the potential difference between grid 5 and filament 4 of Figure 1 for a constant value of battery 13. Assume that the preassigned maximum current in output circuit 9 is represented by the ordinate $o\,a$; then by proper adjustment of battery 8 or resistance 15 the temperature of cathode 4 may be made such that the current in circuit 9 cannot exceed said maximum current even if battery 13 or the potential difference between grid 5 and cathode 4 is indefinitely increased. Let battery 13 be given a definite value which provides for a direct current at least as great as the maximum variation of the variable current to be transmitted during operation of the tube; then the curve of Figure 2 is a plot of the values of current in output circuit 9 against values of potential difference between grid 5 and cathode 4. Battery 14 in the input circuit of the thermionic device 3 is then adjusted so that the actual current in circuit 9 when no external potential is applied to the input circuit is approximately one-half of the limiting current; this current value is shown as $ob$ and the corresponding value of potential of battery 14 is $oc$. Referring now to Figure 1, when current flows in antenna 1, current is induced thereby in circuit 2 and consequently an alternating potential difference between grid 5 and cathode 4 is superposed on the potential of battery 14. As a consequence the resultant potential difference varies from the mean value $oc$ of Figure 2. So long as this resultant potential difference remains within the limits $od$ and $oe$ of Figure 2 the device functions as an amplifier in the usual manner. It is clear, however, that by reason of the aforementioned adjustment of battery 8 no matter how great the superposed alternating potential difference may become, the current in output circuit 9 of Figure 1 is limited between zero and the preassigned maximum $oa$. The current supplied to receiver 12 is of course limited strictly by the current flowing in circuit 9, and therefore the current to receiver 12 is limited by the temperature of cathode 4.

Figure 3 is a diagram illustrating another embodiment of the invention. Referring to said figure, 21 is an alternating current generator connected by a transformer 22 to a circuit 23 containing a thermionic device 24 and a source of direct current energy 25. By means of a second transformer 26, circuit 23 is coupled to a circuit 27 containing a receiving device or load 28. Thermionic device 24 comprises an anode 29 and a cathode 30, said cathode being heated by battery 31. The maximum current which can flow in circuit 23 is limited by the temperature of cathode 30 and therefore can be controlled by battery 31.

Battery 31 or resistance 32 is adjusted to give a cathode temperature such that the maximum current transmissible through the thermionic device and therefore through circuit 23 is approximately twice the preassigned maximum value of the alternating current to be transmitted through circuit 23. Battery 25 is then adjusted to give a steady current approximately equal to said maximum value. The actual current is of course unidirectional in circuit 23, since thermionic device 24 is unilaterally conducting. Generator 21 impresses inductively an alternating voltage on circuit 23 which results in the superposition of an alternating current on the direct current flowing in said circuit. Owing to the above-mentioned adjustments of battery 25 and the temperature of cathode 30, the maximum possible value of this alternating current is equal to the preassigned maximum value of the current to be transmitted through circuit 23. Receiving device 28 is therefore protected against any excessive currents.

Figure 4 is a diagram illustrating a plurality of two-element thermionic devices employed as power limiting devices in a direct current circuit. Referring to said figure, terminals 41 and 42 are to be connected to the positive and negative terminals respectively of a direct current source of energy (not shown) which supplies energy to a load 43. Connected in circuit with said load are a plurality of power limiting thermionic devices 44, 44, 44, each comprising a cathode 45, and an anode 46 contained in an evacuated vessel 47. Cathodes 45, 45, 45 are heated preferably from a common source of energy 48. Battery 48 is adjusted so that the maximum aggregate current through the thermionic devices 44, limited by the temperature of the cathodes 45, is equal to a preassigned maximum current to be transmitted to load 43. Owing to the presence of a plurality of thermionic devices in parallel, low resistance and large current carrying capacity may be combined with complete protection of the load 43 against excessive currents.

It is clear that by providing a plurality of thermionic devices in multiple the resistance of said arrangement may be made as low as desired with, at the same time, complete provision for limiting the maximum current to any preassigned value. It is understood that a plurality of thermionic devices may likewise be employed in the arrangements shown in Figures 1 and 3.

In the arrangement shown in Figure 3, where alternating current energy is to be transmitted, a direct current source of energy 25 which provides for a direct current equal to the maximum value of the alternating current to be transmitted through the circuit is necessary in order that there shall not be rectification of the current. Such source of direct current energy is not required when direct current is to be transmitted, as in the arrangement shown in Figure 4. The necessary condition to be satisfied in all the arrangements shown is that the cathode temperature be adjusted to give an electron emission sufficient to carry the desired current but insufficient to carry a current greater than a preassigned limiting value.

Referring to Figure 5, a wireless receiving system is shown, incorporating the power limiting device of my invention and embodying the same principle as the organization of Figure 1. The arrangement of Figure 5 is particularly adapted for the reception of continuous waves as distinguished from damped oscillations. Antenna 51 is tuned by means of condenser 52 and inductance coil 53 to resonance with the waves it is desired to receive. Said antenna includes a non-inductive resistance element 54 whose value is such as to render the antenna aperiodic. Circuit 55 coupled to said antenna is tuned to resonance at the same frequency as said antenna and is likewise aperiodic by virtue of non-inductive resistance element 56. 57 is a power limiting device, adjusted to limit the current in output circuit 58 to a preassigned value, as hereinbefore explained.

Coupled to output circuit 58 is an oscillation circuit 59, tuned to the frequency of the signals to be received. Receiver 60 is connected to said oscillation circuit through a detector 61, preferably of the vacuum tube type.

In this arrangement of Figure 5 it will be noted that the power limiting device is interposed between the received energy and the oscillation circuit 59. Consequently the magnitude of the relatively sustained oscillations in oscillation circuit 59 is limited to a preassigned maximum value, whereas in the arrangement of Figure 1 the oscillations in oscillation circuit 2, corresponding to oscillation circuit 59 of Figure 5, are not so limited. The advantage of the arrangement of Figure 5 will therefore be seen to consist in limiting the value of the relatively sustained oscillations executed by the receiving oscillation circuit as well as the magnitude of the current energizing receiver 60.

What is claimed is:

1. A power limiting device of the thermionic type comprising an anode and a cathode enclosed in an evacuated vessel; means for heating said cathode and for controlling its temperature thereby limiting the current to said cathode to a preassigned maximum value; and a source of direct current connecting said anode and said cathode, said source being adjusted so that the mean current between said anode and said cathode is approximately one-half said preassigned maximum.

2. In a power limiting apparatus, a vacuum discharge device, comprising hot and cold electrodes, an input circuit and an output circuit associated with said hot electrode, a source of received variations associated with said input circuit, means for tuning said input circuit to a definite frequency, a receiving circuit associated with said output circuit, means for tuning the receiving circuit to a definite frequency, a source of energy in said output circuit, and means for limiting the temperature of said hot electrode, said means being so adjusted that the received variations will be amplified without distortion in said tuned receiving circuit to values restricted to limits which are independent of the source of energy in said output circuit.

3. The method of limiting the transfer of energy through a three-electrode thermionic vacuum tube having a filament, a grid and a plate, which consists in impressing between said grid and said filament potentials from a selected and a non-selected source, causing a thermionic discharge to pass between the said filament and the said plate, and adjusting the temperature of the said filament to substantially amplify without distortion the magnitude of the transferred energy from a selected source and to limit the magnitude of the energy from any source to a value not appreciably greater than the value of the amplified energy from the selected source.

4. The method of limiting the current flow through a three-electrode themionic vacuum tube having a heated electrode, and two cold electrodes, an input circuit connected with said heated electrode and the first of said cold electrodes, an output circuit connected with said heated electrode and the second of said cold electrodes which consists in impressing normal and abnormal potentials upon said input circuit, and limiting the magnitude of the electronic discharge between said heated electrode and said second electrode so that the current in said output circuit when no potentials are applied to the input circuit is approximately one-half that resulting when the normal potential is applied to said input circuit.

5. The method of limiting the current flow through a three-electrode themionic vacuum tube having a heated electrode, and two cold electrodes, an input circuit connected with said heated electrode and the first of said cold electrodes, an output circuit connected with said heated electrode and the second of said cold electrodes which consists in impressing normal and abnormal potentials upon said input circuit, and controlling the temperature of said heated electrode to limit the current flowing in said output circuit to approximately one-half that resulting when said normal potential is applied to said input circuit.

6. The method of limiting the amount of energy to be transmitted from one circuit to a second circuit through the medium of a three-electrode thermionic vacuum tube including a filament, a plate and a grid, said first circuit being connected with said filament and grid, and said second circuit being connected with said filament a plate, which consists in impressing normal and abnormal energy upon said first circuit, allowing said energy to vary the potential of said grid to said filament, rendering the plate filament path conductive to a predetermined degree by controlling the temperature of said filament, the degree of conductivity being such as to amplify the normal energy in passing it to said second circuit but to limit the magnitude of the abnormal energy passed to said second circuit to a value only slightly greater than that of the amplified normal energy.

7. The method of operating an energy transmission system, which is subject to abnormal energy conditions and which comprises a circuit arrangement containing a device which is adjusted to limit the current flowing in that circuit arrangement to a predetermined value irrespective of the voltage applied thereto without interrupting the continuity of the circuit arrangement, which consists in producing by means of the normal energy in the system a voltage of substantially the value required to produce without distortion the maximum possible currents in the circuit arrangement, applying this voltage together with other voltages which may be produced in the system by abnormal energy and thereby limiting the rate at which the abnormal energy is transmitted to substantially the rate at which the normal energy is transmitted through said power limiting device.

8. The method of operating an energy transmission system, which is subject to abnormal energy conditions and which comprises a circuit arrangement containing a device which is adjusted to limit the current flowing in that circuit arrangement to a predetermined value irrespective of the voltage applied thereto without interrupting the continuity of the circuit arrangement, which consists in producing in the system by means of the normal energy from a selected source an alternating signaling voltage whose maximum value is such as to transmit through said device the maximum current without distortion and applying this voltage together with any other voltages which may be created in the system by disturbing agencies and thereby limiting the currents created by said disturbing agencies to substantially that produced by the signaling voltage.

9. In an electric circuit having impressed thereon normal and abnormal potentials, a power limiting device to which said potentials may be applied comprising a thermionic vacuum tube having an electron emitting cathode, an anode and an auxiliary electrode, and means for controlling the emissivity of the said cathode adjusted to permit the maximum amplification without distortion of the normal potential impressed across said cathode and said auxiliary electrode, and to limit all potentials transmitted through the said tube to a value slightly greater than that of the amplified normal potential.

10. In a system for the transmission of electrical energy which is also exposed to a source of abnormal energy, the combination with a source of normal energy of a receiving arrangement, a thermionic device connecting said source and said receiving arrangement, the said thermionic device comprising a cathode, an anode, an auxiliary electrode and an evacuated vessel enclosing said cathode, anode and auxiliary electrode, means for heating the said cathode, and means to control the said heating adjusted to amplify without distortion a wave of normal energy and to limit the impulses of abnormal energy to a value not much greater than that of the amplified normal energy.

11. The method of controlling the amount of electrical energy from selected and non-selected sources that may be transmitted through a circuit including the normally non-conducting gap of a vacuum tube, which consists in rendering the said gap conductive and adjusting its conductivity so that the current normally flowing across the said gap is slightly less than one-half of the maximum current that may be produced by energy from any source, whereby the energy from the selected source may be transmitted without distortion, and whereby the energy from the non-selected source transmitted through the said gap may be limited to a value not much greater than the maximum value of the amplified energy from the selected source.

In testimony whereof, I have signed my name to this specification in the presence of two subscribing witneses, this 11th day of March 1916.

LLOYD ESPENSCHIED.

Witnesses:
RALPH W. WOLF,
FRED'K S. ROBINSON.